May 9, 1967  N. R. CLARK  3,319,144
TIMER CONTROL MECHANISM WITH INDEXING MEANS
Filed May 4, 1964  3 Sheets-Sheet 1

INVENTOR.
Norman R. Clark
BY
J.C. Evans
HIS ATTORNEY

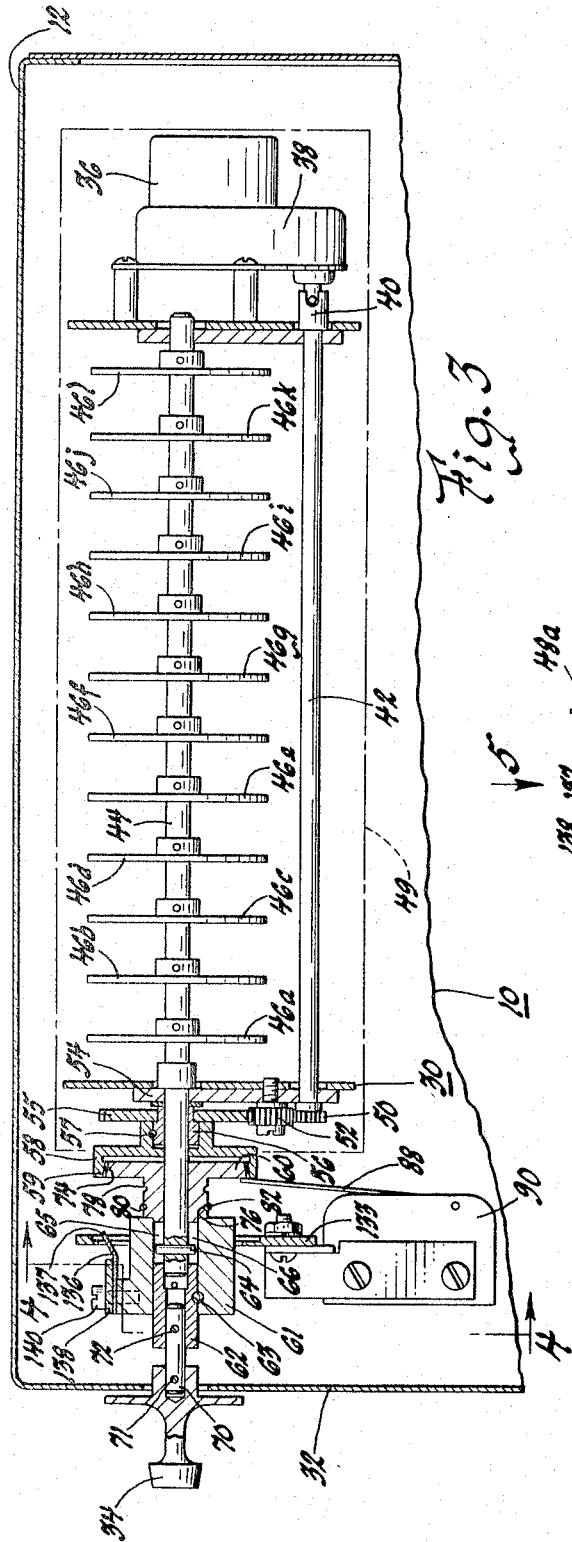
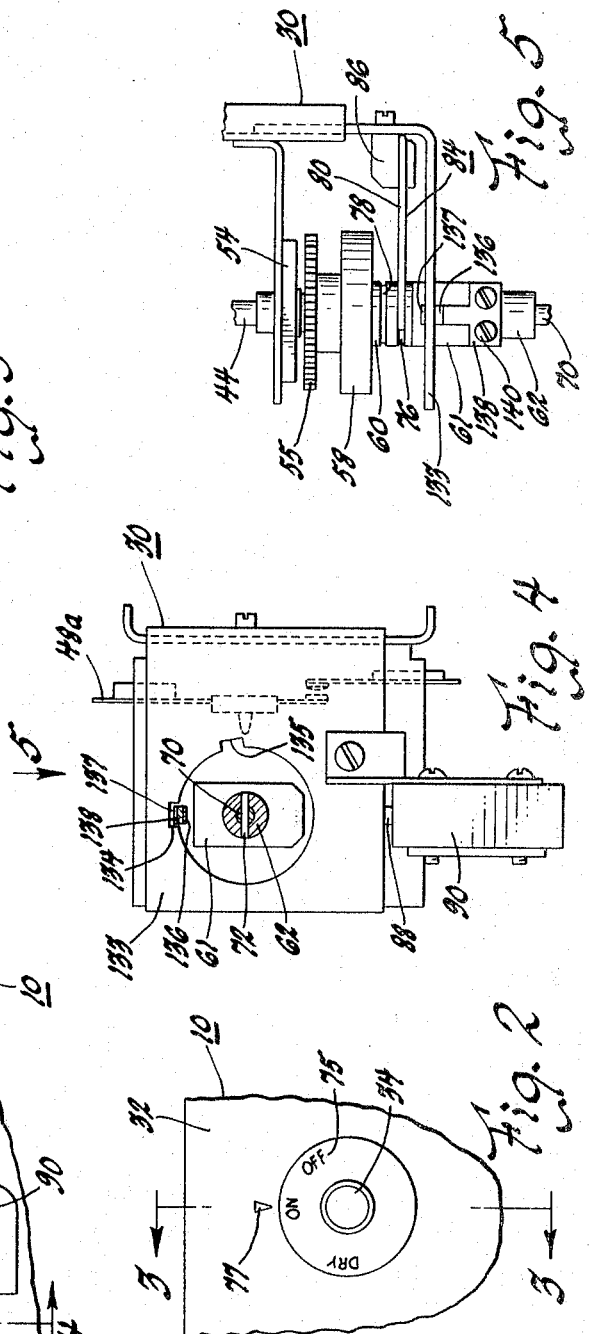
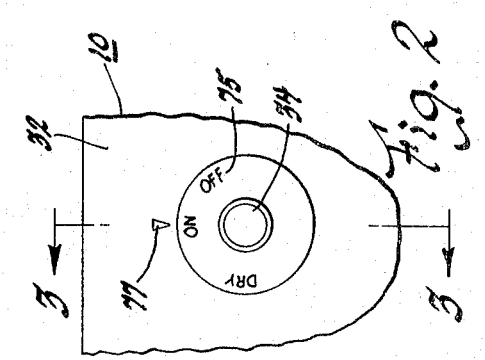

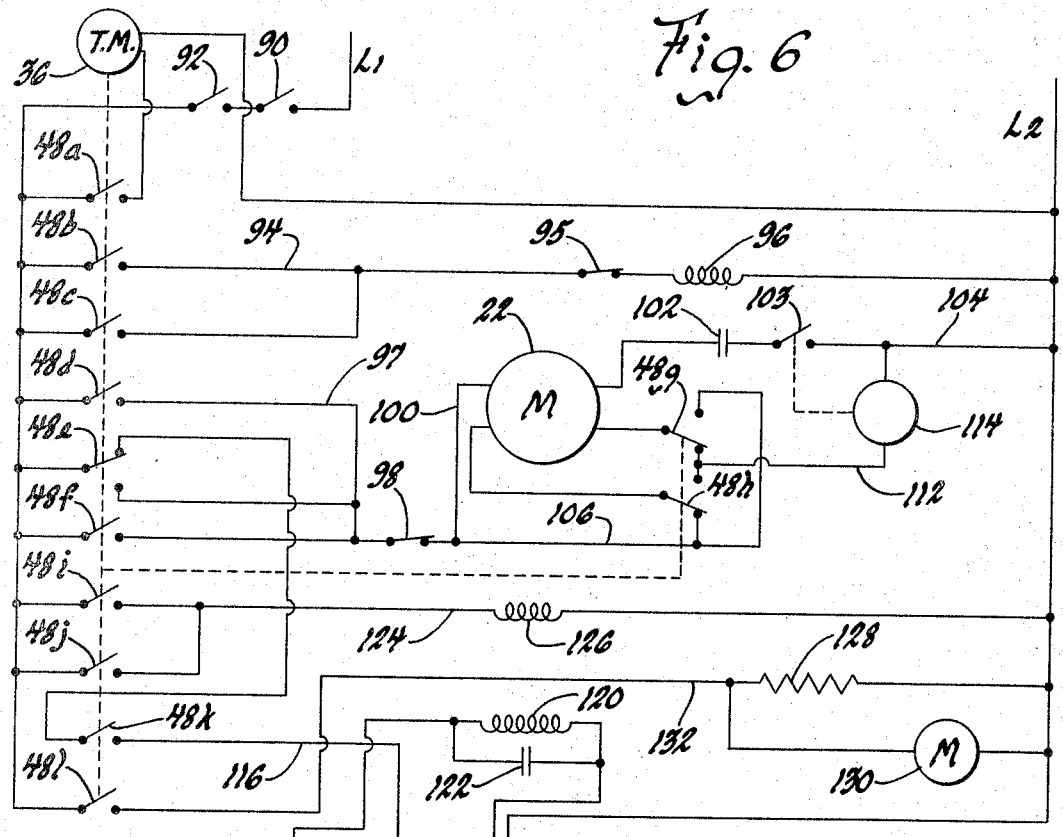

United States Patent Office 3,319,144
Patented May 9, 1967

3,319,144
TIMER CONTROL MECHANISM WITH
INDEXING MEANS
Norman R. Clark, Clawson, Mich., assignor to General
Motors Corporation, Detroit, Mich., a corporation of
Delaware
Filed May 4, 1964, Ser. No. 364,703
2 Claims. (Cl. 318—284)

This invention relates to a domestic appliance and more particularly to an improved timer arrangement for automatically controlling the sequential operation of a domestic appliance.

In certain automatically controlled domestic cleaning appliances means including reversible electric motors are provided for actuating a tumbling drum or the like to effect a predetermined multiple-speed operation thereof. One problem in such arrangements, however, is that many of the more economical reversible motor types are characterized by an inability to reverse during normal operating speeds. Thus, inadvertent resetting of the timer that by-passes dwell periods in which the motor slows down for reversal may result in motor operation inconsistent with desired timer programmed results.

An object of the present invention, therefore, is to improve a timer mechanism for controlling the sequential steps in a preprogrammed automatic cleaning operation by the provision of means therein including indexing means to prevent resetting of a manually rotated knob portion of the timer in other than preselected rotational positions whereby an electric drive motor associated therewith is slowed down for reversal between adjacent cycles of the automatic operation.

A further object of the present invention is to improve a timer assembly for sequentially conditioning the operative parts of an automatic cleaning device so as to produce a washing cycle of operation wherein a tumbling drum is operated at a first predetermined rotational speed, an intermediate spin dry cycle wherein the tumbling drum is driven at a high spin speed upon reversal of motor operation and wherein the drum is then driven at the lesser tumbled speed during a dry cycle upon a further reversal of motor operation by the provision of means for preventing initial presetting of a manually rotatable knob of the timer that would initially condition the device to produce the high-speed cycle of operation.

A further object of the present invention is to provide an improved timer control including a manually rotatable knob for presetting a desired cycle of operation, means for limiting the initial rotational preset positions of the manually rotatable knob and circuit means associated therewith for conditioning a reversible motor to assure multiple-speed operation of an automatic cleaning device.

Further objects and advantages of the present invention will be apparent from the following description, reference being had to the accompanying drawings wherein a preferred embodiment of the present invention is clearly shown.

In the drawings:

FIGURE 2 is an enlarged, fragmentary view in front elevation looking in the direction of arrow 2 in FIGURE 1;

FIGURE 3 is a view in vertical section taken along the line 3—3 of FIGURE 2;

FIGURE 4 is a view in vertical section taken along the line 4—4 of FIGURE 3;

FIGURE 5 is an elevational view looking in the direction of arrow 5 in FIGURE 4;

FIGURE 6 is a program chart showing the sequence of the timer control; and

FIGURE 7 is a diagrammatic electric circuit controlled by the timer.

Figure 1:
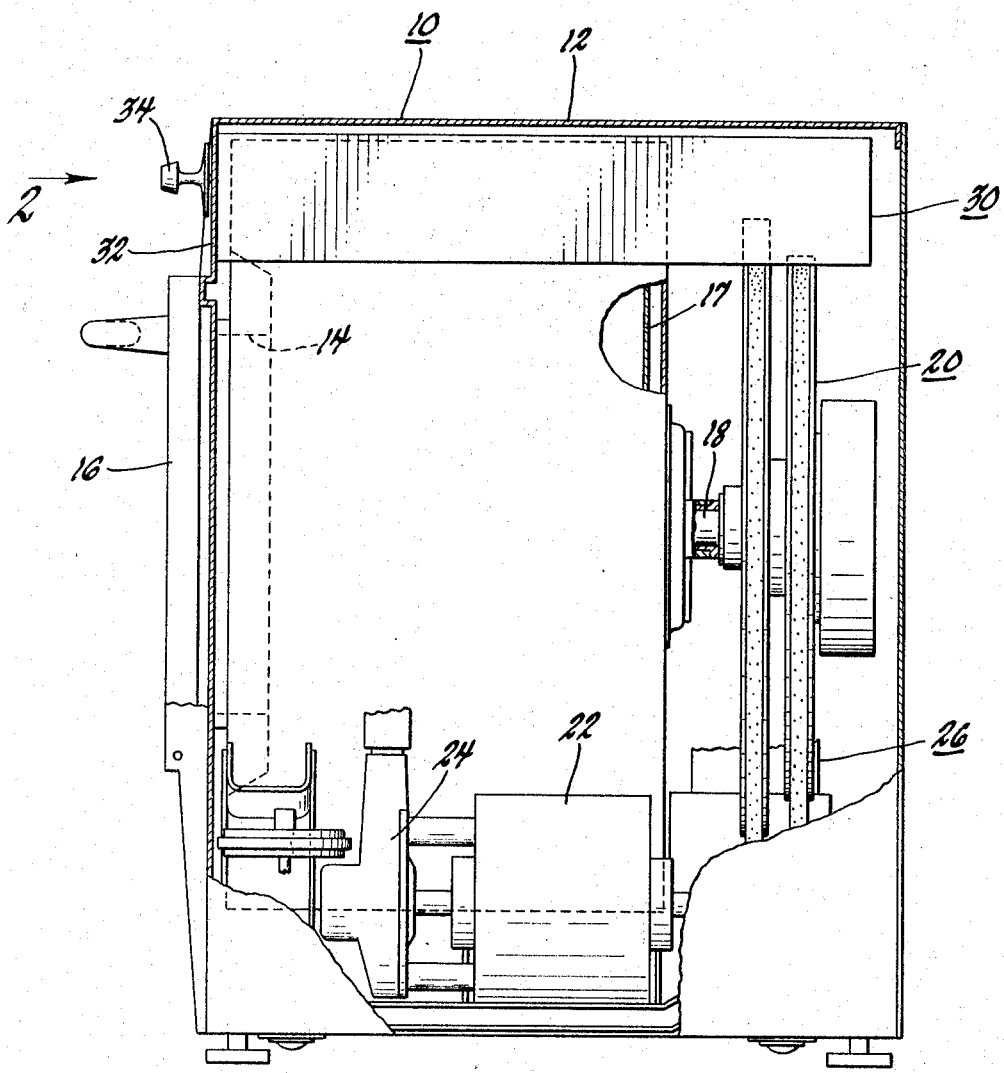
FIGURE 1 is a view in side elevation, partially broken away, of an appliance including the timer control of the present invention.

Referring now to the drawings, a small capacity combination washer-dryer unit 10 is illustrated including an outer cabinet 12 having an access opening 14 therein closed by a door 16. When the door 16 is open, clothes may be inserted through the access opening 14 into a rotatable drum 17 driven through a shaft 18 by means of a two-speed drive assembly 20 of the type more specifically set forth in the United States Patent No. 3,252,357, issued May 24, 1966 to Robert F. Smith.

As was pointed out in the copending Smith application, rotation of a reversible drive motor 22 in a first predetermined direction will produce a low-speed rotation of the drum 17 in a like direction and upon rotation of the motor 22 in an opposite direction, the drum will rotate oppositely at a high speed. In one working embodiment drum speeds at low and high speed were 50 and 240 r.p.m., respectively.

The compact combination washer-dryer 10 further includes a fluid circulation system 24 more detailedly set forth in the copending Smith application as including a water level switch, a fill solenoid and a drain solenoid for controlling water fill and drain from the machine during the operation thereof. The machine further includes a hot air circulation system 26 including suitable ductwork, an air heater and an air blower that cooperate to produce a desired hot air flow during the drying cycle of the machine.

In accordance with certain principles of the present invention, the operation of the machine 10 is controlled by an improved timer assembly 30 shown as being mounted rearwardly of the front wall 32 of the outer cabinet 12 of the machine 10 where a rotatable knob 34 is located for presetting a desired cycle of operation. The timer assembly, as best illustrated in FIGURE 3, includes a synchronous motor 36 operatively associated with an escapement mechanism 38 connected by a coupling 40 to an elongated drive shaft 42 arranged in spaced parallelism with a rotatable cam carrying shaft 44 having a plurality of cams 46a through 46l at spaced axial locations therealong secured thereto for rotation with the shaft 44. Cooperating cam switches are arranged within the outer casing 49 of the assembly 30 so as to be operatively associated with cams 46a through 46l, respectively, for producing a desired sequential operation in the machine 10. One such sam switch 48a is illustrated in FIGURE 4 in one suitable operative relationship. Other like switches (not shown) are similarly arranged by the other cams.

The drive from shaft 42 to cam shaft 44 is effected in part by gear means including a spur gear 50 secured on the forward end of shaft 42, an idler gear 52 on a support member 54 and a spur gear 55 supportingly secured to a rotatable bearing 56 on shaft 44 forwardly of member 54. An outer peripheral portion of the bearing 56 is fixedly secured by a pin 57 to a clutch element 58 having an inclined forwardly facing clutch surface 59.

A complementary clutch element 60 integrally formed on one end of a tubular clutch block 61 serves to transmit the drive from the freely rotatable gear driven clutch element 58 into cam shaft 44. More particularly, the tubular clutch block has a tubular insert 62 directed into one end thereof fixedly secured thereto by a pin 63 and the forwardmost end of the cam shaft 44 is directed into the opposite open end of the clutch block 61 where it is secured against rotation relative thereto by a cross pin 64 slidably received within a pair of spaced grooves 65, 66 in the block for axial movement relative thereto thereby enabling the block to be moved axially with respect to the cam shaft 44 while producing rotation of the cam shaft 44 upon rotation of the block 61.

In the illustrated embodiment of the invention the manually actuatable control knob 34 is operatively associated with the timer assembly 30 by means of a spindle 70 having one end thereof directed into an end opening in the handle 34 where it is fixedly secured for rotation therewith by a pin 71 and having the opposite end thereof received within the tubular insert 62 and being fixedly secured thereto by a pin 72. By virtue of the above-described arrangement, the manually actuatable control knob 34 is movable outwardly of the front surface 32 of the outer casing 12 whereby the clutch element 60 is moved out of engagement with the gear driven clutch element 58 and the cam shaft 44 is operatively disengaged from the drive shaft 42. When the knob 34 is pushed inwardly the clutch elements 58, 60 are in operative engagement wherein an inclined surface 74 on the clutch element 60 is in frictional engagement with the inclined surface 59 on clutch element 58. Thus, the drive from shaft 42 is transmitted through the associated clutch members 58, 60, the clutch block 61, tubular insect 62 and spindle 70 for advancing suitable indicia 75 on the knob 34 with respect to an indicator pointer 77. Also, rotation of the block 61 is transmitted through pin 64 into the cam shaft 44 for advancing the cam elements 46a through 46l with respect to their associated switches. Suitable spaced apart grooves 76, 78 are present in the outer periphery of the clutch element 60 to receive spaced apart ends 80, 82 of a U-shaped spring 84 having the bight portion thereof fastened in a notched spring retainer element 86 fixedly secured to a portion of the housing 49 of the timer assembly 30. When the knob 34 is in its pulled out position, the outboard face of the clutching element 60 moves an elongated spring element 88 to condition a limit switch 90 to de-energize the control circuit for the machine so that when the knob is manually rotated into a desired preset position, the switches associated with cams secured to the shaft 44 will not arc unnecessarily. Pushing the knob 34 in will energize these switches as will become clearer on discussing the circuit of FIGURE 7.

By virtue of the above-described timer assembly 30, when it is desired to start the illustrated machine 10, the knob 34 is rotated so that the indicator pointer 77 is aligned with a part of the indicia 75 on the front face of the knob 34, for example, an "on" position. At this point, the knob is moved axially inwardly and the clutch block 61 will be moved inwardly until the clutch element 60 enters the clutch element 58.

Now with reference to the circuit of FIGURE 7 and chart of FIGURE 6, when the knob 34 is so inwardly positioned, the clutch element 60 no longer holds the movable spring 88 inwardly of switch 90 and the switch is thereby closed. Now, when a door switch 92 is closed and the knob is in its "on" position, the cam shaft 44 is positioned so that cam switch 48a is closed to complete a circuit between lines $L_1$ and $L_2$ of a 115 volt, 60 cycle A.C. source for energizing the timer motor 36. A cam switch 48b is also closed to complete a circuit between lines $L_1$, $L_2$ through a conductor 94 that includes a water level switch 95 and fill solenoid 96 whereby a predetermined water fill cycle is initiated, which, in the representatively illustrated program shown in FIGURE 6, is of a forty-five second duration providing approximately a three-gallon water fill within the interior of the outer drum of the machine 10 which quantity has been found suited for cleaning a clothes load in the range of two to three pounds.

Following the fill cycle of operation, the synchronous motor 36 advances the cams so that cam switch 48b opens and cam switch 48d closes to initiate a two-minute wash cycle wherein the circuit through conductor 94 is opened to terminate water fill and a start circuit through switch 48d, a conductor 97, a jog switch 98, a conductor 100, motor 22, a capacitor 102, closes relay contacts 103 and a conductor 104 is completed between $L_1$, $L_2$ so as to condition the motor for rotation in a clockwise direction to produce a tub rotation of fifty-five r.p.m. whereby the clothes load therein is tumbled to carry out a desired cleaning action. During motor rotation clockwise the running circuit therethrough passes from jog switch 98 through conductor 106, a pair of cam reversing switches 48g, 48h, thence to conductor 112, a relay coil 114 and conductor 104. By virtue of this arrangement the relay contacts 103 are opened following start to open the start winding. To reverse motor rotation in this type of motor, it is necessary to slow the motor substantially before the reversing switches 48g, 48h are thrown. While the motor is illustrated as a capacitor-start, single phase A.C. induction motor, it will be appreciated that the inventive timer assembly is equally well suited for association with other motors characterized by an inability to reverse at running speeds without first being materially slowed down. Whenever the motor is conditioned for clockwise rotation, cam switch 48k is closed to complete a circuit between $L_1$, $L_2$ including conductor 116, a full-wave rectifying bridge 118 having the output terminals connected across a coil 120 and paralleled capacitor 122 in an electric clutch component of the drive 20 as more detailedly set forth in the above-mentioned copending Smith application.

In the illustrated program the washing cycle is of a two-minute duration following which time the timer motor 36 advances the cams so as to cause the cam switch 48i to close a circuit through a conductor 124, connecting a drain solenoid 126 between lines $L_1$ and $L_2$ to thereby produce a drain cycle of one and three-quarters minutes in duration.

Followng one minute of the drain cycle, fill solenoid 96 is re-energized by closing the cam switch 48c for one and one-quarter minutes. One minute following re-energization of fill solenoid 96, the drain solenoid cam switch 48i is opened to de-energize the drain solenoid during one quarter of a minute of the fill for rinse cycle whereby a slight amount of rinse water is retained in the clothes. Following rinse-fill the motor clockwise cam switch 48d and clutch cam switch 48k are closed and the drum thereby is tumbled at the fifty-five r.p.m. speed for one minute and then drain cam switch 48i is closed to drain water from the drum during the last minute and fifteen seconds of the rinse and drain cycle and thereafter for the rest of the operation of the machine. Following the drain, fill for rinse, rinse and rinse-drain cycles described above, the motor clockwise cam switch 48d is opened to de-energize the motor 22 for a ten second dwell period necessary to stop the motor for reversal of rotation thereof. During the ten second dwell, motor reversing cam switches 48g and 48h are moved to their motor counterclockwise rotation position and motor counterclockwise cam switch 48e is moved to energize motor 22 and de-energize the clutch coil 120. Such motor drive produces a two-hundred forty r.p.m. drum tumbling speed to carry out a desired spin dry cycle during which time the magnetic clutch of drive 20 is de-energized to prevent feedback to the drive shaft of the motor as more specifically discussed in the copending Smith application.

The spin dry cycle in the illustrated program is of a three-minute duration at the end of which time the motor counterclockwise cam switch 48e is positioned to de-energize motor 22 and a ten second dwell occurs before the motor clockwise cam switch 48f closes to condition the motor for reverse rotation. During the ten second dwell period between motor counterclockwise and clockwise rotation, the motor reversing cam switches 48g and 48h are positioned to effect the desired reversal of rotation.

Following the spin dry cycle the motor clockwise cam switch 48f, drain solenoid cam switch 48j, magnetic clutch cam switch 48k and a heater and blower cam switch 48l are closed whereby a drying cycle of twenty and three-quarters minutes duration is carried out during which time the drum is rotated clockwise at fifty r.p.m. and an air heater 128 and blower motor 130 in conductor 132 across lines $L_1$, $L_2$ are energized to effect a desired circulation of heated air through the slowly tumbling clothes for removing any moisture therefrom that remains following the spin dry cycle.

By virtue of the above-described control arrangement, a complete washing, spin dry and drying cycle of operation can be carried out with a clothes load of around two pounds in a relatively short period of time. In the illustrated arrangement, if all moisture is not removed from the clothes during a first drying cycle, a portion of the drying cycle can be reset by the timer mechanism to obtain complete drying.

In the illustrated arrangement it is necessary to include cam dwells to stop the motor 22 between the wash and spin dry cycles in order to avoid by-passing the spin dry operation by continuing to rotate clockwise. In most timers, the manually rotatable knob portion thereof, however, can be reset to any rotational position to initiate a particular phase of machine operation before the reversible motor actually has time to stop. In other words, cam dwell periods can be manually by-passed. In accordance with certain principles of the present invention, however, the timer assembly 30 has been modified to prevent a user of the illustrated appliance from manually resetting the control knob in a manner which will by-pass the spin dry cycle or like cycles in machines having such problems.

More specifically, with reference to the structural FIGURES of 2 through 5, a locator plate 133 is supported to surround the clutch block 61. The locator plate 133 includes a pair of arcuately arranged notches 134, 135 therein that cooperate with an elongated spring arm 136 having a free end 137 biased away from clutch block 61 and an opposite end fixedly secured to block 61 by suitable means representatively shown as a plate 138 and screws 140. By virtue of this arrangement, when it is desired to reset the timer assembly 30, a user merely pulls the knob 34 outwardly. This forces the spring end 137 toward clutch block 61 so as to clear the inner periphery of locator plate 133. The clutch elements 58, 60 are thereby disengaged and the knob 34 is freely rotatable. To reset the timer, the user cannot by-pass the spin cycle without knowing it since the knob can only be pushed inwardly at the beginning of the dry cycle of operation or at the "on" position.

The knob does offer sufficient resetting points to enable the user to select a complete dry cycle without using the wash or spin dry cycles and also enables the user to carry out a washing cycle without proceeding through a drying cycle where it is not desired.

While the embodiment of the present invention as herein disclosed constitutes a preferred form, it is to be understood that other forms might be adopted.

What is claimed is as follows:

1. In a cleaning device the combination of, a reversible electric motor, circuit means including a plurality of cam operated switch means for conditioning said motor for opposite rotation, means including drive means operatively associated with said reversible electric motor for effecting a plurality of operative cleaning cycles, timer motor means, a rotatable shaft, a plurality of cam means on said rotatable shaft operatively associated with said cam switch means for effecting a sequential conditioning of said circuit means, means for drivingly connecting said motor means to said rotatable shaft including clutch means, a push-pull knob operatively associated with said clutch means for engaging and disengaging said clutch means, said push-pull knob being manually rotatable when in a pulled-out position to rotate said shaft for presetting said cam switch means, means for de-energizing said cam switch means when said knob is in its pulled-out position, and indexing means for limiting movement of said push-pull knob into its pushed-in position following rotational movement of said shaft to prevent energization of said cam switch means in all but a predetermined limited number of controlling positions, said indexing means including a locator plate surrounding said push-pull knob, means forming a predetermined number of guide openings in said locator plate, spring means on said push-pull knob freely movable with respect to said locator plate upon movement of said knob into its pulled-out position and including means engageable with said locator plate upon movement of said knob into its pushed-in position except at said guide openings, said spring means and said guide openings cooperating to prevent a predetermined manual conditioning of said plural cycles of operation.

2. In a cleaning device the combination of, a reversible electric motor, circuit means including a plurality of cam operated switch means for conditioning said motor for opposite rotation, means including drive means operatively associated with said reversible electric motor for effecting a plurality of operative cleaning cycles, a rotatable shaft, a plurality of cam means on said shaft operatively associated with said cam operated switch means, timer motor means for effecting a sequential conditioning of said circuit means, means including a gear element operatively connected to said timer motor means, said gear element rotatably supported by said rotatable shaft, a first clutching element fixedly secured to said gear element for rotation therewith, a rotatable push-pull member, means for operatively connecting said member to said rotatable shaft, a second clutching element fixedly secured to said push-pull member and axially slidably mounted on said rotatable shaft, said first and second clutching elements being operative upon engagement for transmitting drive from said timer motor means to said cam carrying shaft, said push-pull member disengaging said clutching elements when in a pulled out position, a locator plate surrounding said push-pull member, means forming a predetermined number of guide openings in said locator plate, spring means on said push-pull member freely movable with respect to said locator plate upon movement of said member into its pulled-out position and including means engageable with said locator plate upon movement of said member into its pushed-in position except at said guide openings, said spring means and said guide openings cooperating to prevent a predetermined manual conditioning of said plural cycle operation.

References Cited by the Examiner

UNITED STATES PATENTS

| | | | |
|---|---|---|---|
| 1,940,928 | 12/1933 | Wyman | 318—284 |
| 2,029,349 | 2/1936 | Wagner | 307—141.4 |
| 2,187,406 | 1/1940 | Staples | 307—141.4 |
| 2,915,120 | 12/1959 | Smith | 318—466 |
| 2,971,143 | 2/1961 | Stillwell | 318—466 |
| 3,060,288 | 10/1962 | Gallagher et al. | 200—38 |
| 3,194,903 | 7/1965 | Dronberger | 200—38 |

BENJAMIN DOBECK, *Primary Examiner.*

ORIS L. RADER, *Examiner.*

J. C. BERENZWEIG, *Assistant Examiner.*